(12) United States Patent
DeFolo

(10) Patent No.: US 7,562,356 B2
(45) Date of Patent: Jul. 14, 2009

(54) AUTOMATICALLY RESOLVING PATCH DEPENDENCIES FOR A PATH BUNDLE

(75) Inventor: Daniel DeFolo, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1044 days.

(21) Appl. No.: 10/947,676

(22) Filed: Sep. 22, 2004

(65) Prior Publication Data

US 2006/0064685 A1 Mar. 23, 2006

(51) Int. Cl.
*G06F 9/44* (2006.01)
*G06F 9/45* (2006.01)

(52) U.S. Cl. .................. 717/169; 717/168; 717/170; 717/174; 717/175

(58) Field of Classification Search ................. 717/169, 717/170, 175
See application file for complete search history.

(56) References Cited

U.S. PATENT DOCUMENTS

2002/0112230 A1* 8/2002 Scott ........................... 717/169
2003/0218628 A1* 11/2003 Deshpande et al. ......... 345/738

* cited by examiner

*Primary Examiner*—Insun Kang

(57) ABSTRACT

A method for automatically resolving patch dependencies for a patch bundle is disclosed. The method includes recursively performing steps a) through b) until there are no more required dependencies to be added. Step a) includes ascertaining a first plurality of patches, the first plurality of patches representing patches currently in the patch bundle. Step b) includes adding patches that are required dependencies of the first plurality of patches to the first plurality of patches, the adding excluding any of the required dependencies that is already in the first plurality of patches prior to the adding or superseded by any patch in the first plurality of patches prior to the adding.

20 Claims, 14 Drawing Sheets

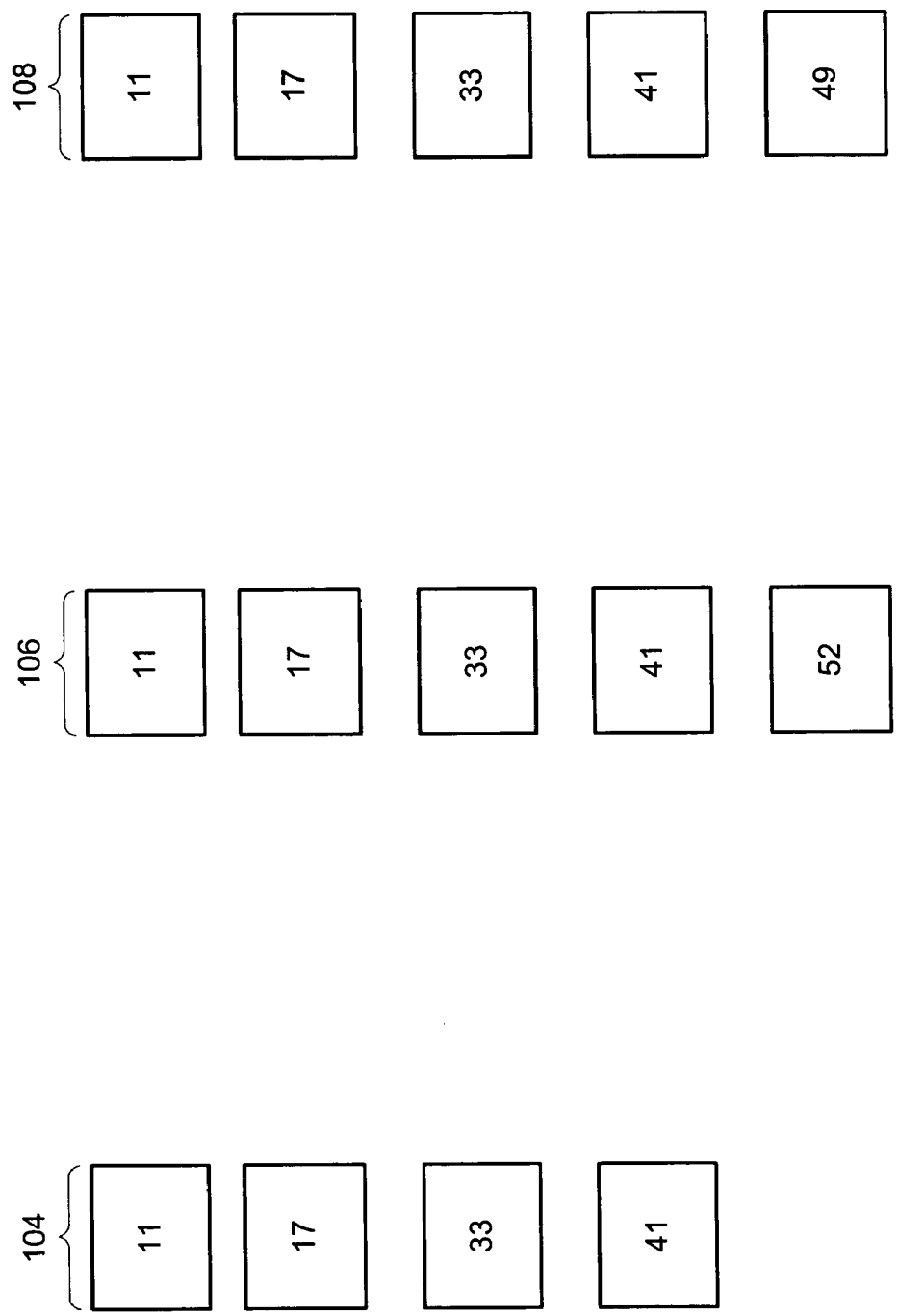

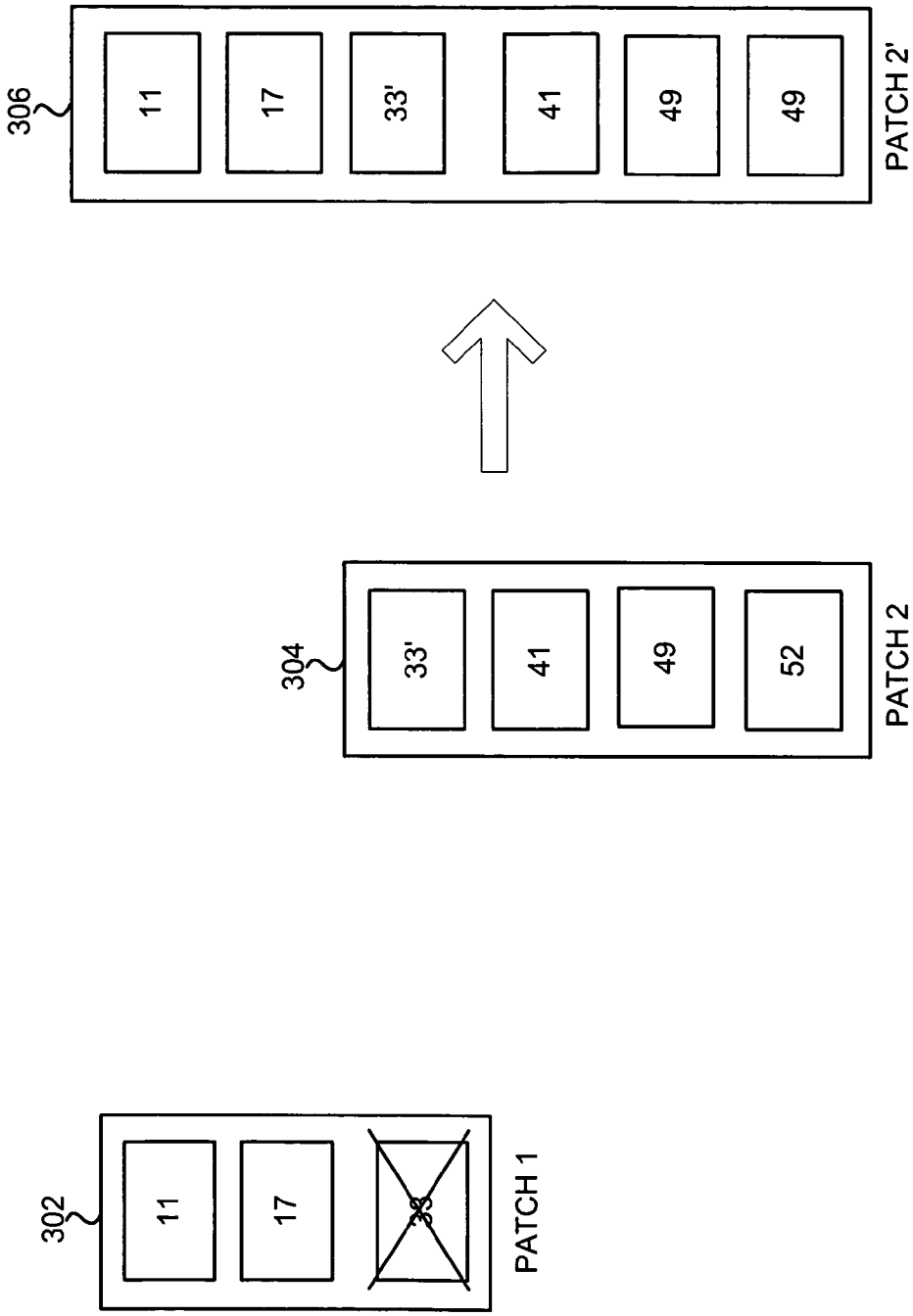

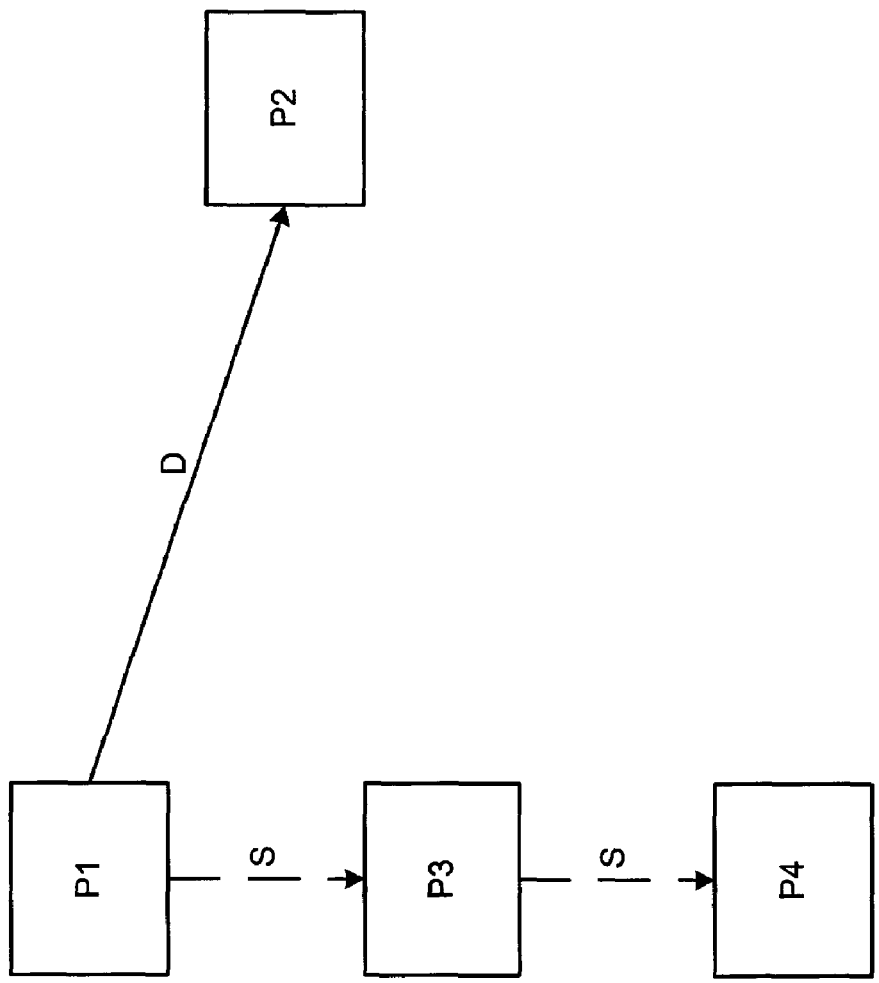

AUTOMATICALLY RESOLVING PATCH DEPENDENCIES FOR A PATH BUNDLE

BACKGROUND OF THE INVENTION

In the computer field, patches are subsequent releases for an existing software product in order to fix problems or to add one or more new features. Patches may be employed to, for example, fix software bugs and/or implement new security features for an existing operating system or another application. The number of patches required to implement a given feature may vary from computer to computer, depending on the current configuration and how updated a given computer is (i.e., the computer's update status). For example, one computer may require a single patch to implement a particular feature, while another computer not kept up-to-date may require five different patches to both bring that computer up-to-date and to implement that particular feature.

One way to implement a software patch is for manufacturers to provide all available software patches for a particular product to users, and each computer user must select the appropriate patch or patches for his computer. However, this primitive approach requires a high degree of skill on the part of the individual computer user, and is error-prone. Further, the number of available patches may be extremely large (perhaps thousands of patches, with each patch having a length of multiple megabytes of data, for a product such as an operating system, for example). The unwieldy size of such a patch renders the process intolerable even for the most skilled and careful user.

The task is further complicated by the fact that a patch may depend on other patches and/or may have been fixed by yet other patches, all of which need to be installed together by the computer user for his computer to work properly.

FIG. 1A illustrates a portal-based approach to implementing patches, representing an improvement over the aforementioned manual technique. This is the current approach taken by software vendors such as Microsoft® for implementing patches to their Windows® operating system on users' computers, for example. Using a network such as the internet 102, users at computers 104, 106, and 108 may access a portal 110, which may be implemented as a website. Portal 110 then queries each individual computer, such as computer 104, to ascertain its patch status, i.e., to ascertain what patch level has already been performed, if any, on computer 104. Portal 110 may then ascertain, in view of the information obtained from computer 104 about its patch status, the set of patches required to implement a particular feature or a bug fix.

FIG. 1B shows the list of patches that each of computers 104, 106, and 108 may need to apply in order to, for example, fix a particular software bug. As shown, computer 104 requires four patches (11, 17, 33, and 41); computer 106 requires five patches (11, 17, 33, 41, 52), and computer 108 requires five different patches (11, 17, 33, 41, and 49). As mentioned, different patch status in different computers necessitate different sets of patches to bring the computers up to the required functionality level.

Although the portal-based approach of FIG. 1A streamlines the patch installation process somewhat, there are drawbacks. For example, the portal-based approach is not scalable for organizations that need to install patches in hundreds or thousands of computers at once. In some of these organizations, the task of installing patches may be delegated to an IT (Information Technology) staff, which may not have the manpower to timely update hundreds or thousands of computers one by one.

Further, the portal-based approach requires access to the individual computers in order for the portal to ascertain the patch status thereon. For some organizations, such as governmental agencies, security concerns may require that these computers be inaccessible from outside, e.g., from the Internet. Even in organizations that allow their computers to be connected to the Internet, firewalls and other security measures may complicate access. Further, some computers may be inadvertently turned off by their users at the time when the portal needs to access those computers for patch status assessment. Without this data, the portal cannot come up with the required list of patches to be applied.

Another approach involves the creation, distribution and on-site application of service packs. If a software product has been in use for some time, the manufacturer may decide to create a service pack, which encapsulate multiple patches over time, to be distributed to users. A service pack may be thought of as an atomic unit in that it needs to be applied in its entirety, and a user does not have an option to install only a portion of a service pack. Furthermore, service packs tend to be universal in nature and tend to be oriented toward software fixes or toward features that need to be distributed to all users.

With respect to FIG. 2, service pack SP1 represents an encapsulation of three patches: 11, 17, and 33. Suppose a software manufacturer decides that a new security feature is required to keep all users of a particular operating system safe and that the patches of FIG. 1B are required to implement this new security feature. The user of computer 104 may then apply service pack SP1 and patch 41 to activate the new security feature. The user of computer 106 may then apply service pack SP1 and patches 41 and 52 to activate the new security feature. The user of computer 108 may then apply service pack SP1 and patches 41 and 49 to activate the new security feature.

As mentioned, service packs are typically defined by manufacturers for all users. A given service pack may not install all features desired by a particular user, may include a large number of features that the user does not want to burden his computer with, or may simply not include any feature desired by a particular user. Yet a user has no choice but to install the entire service pack, or must revert to the more cumbersome manual approach or portal-based approach to install just the individual patches to obtain the feature(s) he wants.

Due to the static nature and large size of service packs, it is fairly common to need to install a stream of service packs and/or patches in order to obtain the desired functionality (e.g., the user must install service pack 1, before service pack 2, before installing patch 3 and so on). One way to avoid dealing with this issue is to use another approach known as "patch bubbling" or "supersession" which aims to create a cumulative and continuously updated set of changes to related components of the software being patched. In this system, each patch that is released is cumulative in that it contains all changes that have been made to the components it is delivering that have been released in previous patches. In this sense, if the components being delivered by a patch have been previously delivered by another patch, or set of patches, the current patch would supersede those previous patches. By supersede it is meant that it would deliver all the changes those previous patches delivered and thus those patches would become obsolete. As time progresses and those same components are patched again and again, it creates a stream of superseding patches where at any given time there is only 1 patch that is the most current cumulative version of the changes for a set of components and all other patches to those components have now been superseded by that patch. This cumulative patching system has been classically used by the HP-UX operating system (available from the Hewlett Packard Company of Palo Alto, Calif.), for example.

A cumulative and continuously updated patch would include all components to date to achieve a particular purpose, with each individual component therein representing the most updated version of that particular component. With reference to FIG. 3, for example, if a first existing patch 1 (302) has components 11, 17, and 33. At some point after patch 1 is created, it becomes necessary to create a new patch 2 (304) that modifies components 33', 41, 49, and 52, with component 33' being the more updated version of component 33; However, if patch 2 only delivered the components it modified (304), it would not be cumulative. Thus, through a process known conceptually as "patch bubbling" the modifications needed for patch 2 (304) are merged with the changes made in patch 1 (302) and the new patch 2' (306) is created. As patch 2' (306) contains all changes from patch 1 (302) in addition to the new changes needed for patch 2 (304) it can be said to be cumulative and to supersede patch 1 (302). This processing of "patch bubbling", whereby once a component has been delivered in a patch with other components creates a set of components that must be delivered together in any future cumulative patches to any of those components. This example, components 11 and 17 were added to patch 2' because patch 2 desired to make a change to component 33. One of the drawbacks of such a system are the resulting ever-growing "patch bubbles" that result in patches inevitably growing larger and including more components as the supersession stream grows. The result is that at some point the number of components in each "patch bubbles" will become so large that creating new patches will become error prone and cumbersome due to a need to make unrelated changes to more than one of the components at that same time.

The cumulative patch can then be furnished to each computer. Each computer may then extract the appropriate required constituent components (which may be different from computer to computer) to install in itself. The technology for such extraction and installation is already implemented in, for example, in the HP-UX® environment (HP-UX® represents an operating system available from the Hewlett-Packard company of Palo Alto, Calif.,), the command swinstall offers this functionality.

A compromise approach involves keeping constituent patch bubbles that are not logically and/or functionally related (e.g., not related to the same functionality or same subsystem of the computer) separate and utilizing a patch bundle when necessary to deliver the separate patch streams together. This makes it easier to keep to keep the size of the individual patch streams manageable. It should be appreciated that although a patch bundle comprises a plurality of individual constituent patches, a patch bundle is treated, handled, and applied just like a regular patch after it is formed. One may think of a patch bundle as a composite patch, i.e., a composite of its individual constituent patches. Thus, the term patch and patch bundle may be used interchangeably herein, except in case where the distinction between a patch bundle and its constituent patches is clearly drawn.

Under this approach, each patch bubble can be prevented from growing too large by use of maintaining separate patch bubbles with a dependency relationship. Thus, while it could be a noticeable drawback that each patch might no longer deliver the entire desired functionality, a patch bundle can be used to group the dependent patches together into a single composite patch without the drawback of having to maintain all the components of all the constituent patches from that time forward as a patch bubble. If the functionality from two different patches is required to implement a particular feature, a dependency relationship may be set up whereby a patch P1 may be dependent on a patch P2.

Referring now to FIG. 4A, a single dependency relationship is shown between patch P1 and patch P2, with patch P1 being dependent on patch P2 but not vice versa. Once both patches P1 and P2 are created, changes to the components in each patch may proceed independently. If the user already installed patch P2, and changes are made to one or more components within patch P1 so as to give rise to a patch P3 (which supersedes patch P1), patch P3 would inherit the same dependency as the patch it replaces (i.e., patch P1). Thus patch P3 would continue to be dependent on patch P2. Furthermore, if the user wishes to update the system with the functionality implemented by the latest version of the components within patch P1, only patch P3 needs to be applied since patch P2 has already been applied previously and no change has been made to it. Note that the superseded patch P1 is no longer utilized.

Likewise, if changes are made to one or more components within patch P3 at a later time so as to give rise to a patch P4 (which supersedes batch P3), patch P4 would inherit the same dependency as the patch it replaces (i.e., patch P3). Thus patch P4 would again be dependent on patch P2. If the user wishes to update the system that only has patch P2 installed with the functionality implemented by the latest version of the patches within patch PI, only patch P4 now needs to be applied since patch P2 has already been applied previously and no change has been made to it. Note that the superseded patches P1 and P3 are no longer utilized.

So far, the dependency has only been shown in a single direction (e.g., from patch P1 and its superseding patches P3 and P4 to patch P2). One may also have bidirectional dependencies. FIG. 4B shows such a scenario wherein patch P5 and P6 depend on one another. In this case, any version of each patch stream (represented in FIG. 4B by the vertical columns) will resolve the dependency; however due to the bidirectional dependency, no patch from either stream can be installed without also installing a patch from the other stream. For example, if a user wanted to install P5 that user would also have to install their choice of P6, P9, or P10. The choice for which of P6, P9, or P10 to install is completely up to the end user as any one of the three would fulfill the dependency in this example. To continue this scenario, if the user selected to install P9 along with P5 that user would have successfully resolved the dependency. From that point, that user could additionally install P7 or P8 at any time without having to worry about resolving the dependency again because P9 would already be applied to the system.

Dependencies may be even more complex. FIG. 4C show a dependency tree wherein patch P11 depends on patch P12, which in turn depends on patch P13 and patch P14. Patch P14 depends on patch P15 and patch P16 while patch P13 depends on patch P17. Further, patch P14 depends on patch P18', and patch P15 depends on patch P18. In this scenario, patch P18' is actually the latest version of patch P18. Thus, it is important in this case to install only patch P18' to avoid conflicts and to allow patch P15 to depend on the installed patch P18' instead of patch P18, which has been superseded.

FIGS. 4A-4C are shown to illustrate only some exemplary dependencies. Dependencies can be even more complex and may involve a very large number of entities depending on one another in various combinations and multiple levels of dependency.

The existence of dependencies complicates the process of patch installation, particular when patches are installed using patch bundles and/or individual patches. This is because when a patch bundle and/or individual patch(es) are applied, all dependencies need to be properly resolved and the patch bundle(s) and the patch(es) that were depended upon need to also be installed. In a multi-level dependency situation such as the case shown in FIG. 4C, the resolution of at one level (i.e., the resolution of dependencies for patch P11) may reveal that further resolution is needed at a lower level (i.e., patch P12 upon which patch P11 depends actually has its own dependencies that need to be resolved).

In the prior art, a technique for resolving dependencies has been developed. FIG. 5A shows an implementation of the dependency resolution technique. In step 502, the patch (which may also be a patch bundle) is provided as an input. In step 504, the patch documentation is extracted.

Since each patch is furnished with documentation that describes among other things, the patch name, the patch dependencies, the superseding data, and optional dependency data, an appropriate tool may be employed to parse the patch documentation to provide these pieces of data. To elaborate, the patch name uniquely identifies the patch, such as patch 174 for example. The patch dependencies uniquely identify the patch(es) upon which patch 174 depends. These patches may be, for example, patch 178 and patch 191. The superseding data identifies the patches that have been superseded by the current patch 174. The optional dependency data describes any other dependent patches (e.g., patches 211 and 342) that must also be applied if certain optional features are selected when installing the current patch 174.

In one implementation in the HP-UX® environment (HP-UX® represents an operating system available from the Hewlett-Packard company of Palo Alto, Calif.), the tool Swlist is employed to read the documentation data from the readme.txt file of a patch. In one implementation, the command swlist-a readme-s<path_to_file> may be employed. Once the documentation data is read, expression matching or another technique may be employed to parse the file read to obtain the aforementioned patch name, patch dependencies, and optional dependencies.

In step 506, the required dependencies (i.e., the required dependent patches) are determined. This step is discussed in greater detail in FIG. 5B herein. In step 508, the operator is presented with options and the associated optional dependencies. If the operator wishes to resolve the optional dependencies (510), the operator may then manually determine (512) the optional dependencies depending on the options chosen, if any. The end product is a list of dependent patches (515) that must also be installed for the current patch to apply properly.

FIG. 5B shows in greater detail step 506 (determining the required dependencies). In step 552, the constituent patches in the provided patch bundle are identified. When the provided patch is itself a patch bundle, there are constituent patches, and these constituent patches are identified in step 552. In step 554, the patches that have been superseded by constituent patches of the current patch bundle are determined. In step 556, the complete list of required dependencies for the current patch bundle is determined. In step 558, the list of required dependencies that are not in the current patch bundle or superseded by patches in the current patch bundle is determined. Thereafter, the method returns to step 508 of FIG. 5A to continue to dependency resolution technique.

Although an operator can employ the algorithm of FIGS. 5A and 5B to resolve dependencies of a patch/patch bundle to ascertain additional patches/patch bundles that need to be applied, the process is still laborious and time-consuming. This is particularly in the case where there are multiple levels of dependencies (such as the situation shown in FIG. 4C). When there are multiple levels of dependencies, the operator needs to obtain the dependent patches/bundles, apply the algorithm of FIGS. 5A and 5B to each new dependent patch/bundle found in order to ascertain whether there are even more dependent patches/bundles that need to be installed. If the application of the algorithm of FIGS. 5A and 5B to the dependent patches/bundles yield even more dependent patches/bundles, the operator needs to obtain those additional dependent patches/bundles and apply the algorithm of FIGS. 5A and 5B again.

SUMMARY OF INVENTION

The invention relates, in one embodiment, to a method for automatically resolving patch dependencies for a patch bundle. The method includes recursively performing steps a) through b) until there are no more required dependencies to be added. Step a) includes ascertaining a first plurality of patches, the first plurality of patches representing patches currently in the patch bundle. Step b) includes adding patches that are required dependencies of the first plurality of patches to the first plurality of patches, the adding excluding any of the required dependencies that is already in the first plurality of patches prior to the adding or superseded by any patch in the first plurality of patches prior to the adding.

In another embodiment, the invention relates to a computer-implemented method for automatically resolving patch dependencies for a patch bundle. The method includes a) ascertaining a first plurality of patches, the first plurality of patches representing patches in the patch bundle. The method also includes b) adding a set of superseded patches to a list of supersedes, the set of superseded patches representing patches that are superseded by the first plurality of patches and not already in the list of supersedes. The method additionally includes c) ascertaining a second plurality of patches, the second plurality of patches represent required dependencies of the first plurality of patches that are neither in the first plurality of patches nor in the list of supersedes. The method also includes d) adding, if the second plurality of patches has at least one member, the second plurality of patches to the first plurality of patches, thereby increasing a number of members in the first plurality of patches and repeating step b), step c) and step d).

In another embodiment, the invention relates to an article of manufacture comprising a program storage medium having computer readable code embodied therein, the computer readable code being configured to automatically resolve patch dependencies for a patch bundle. There is included computer readable code for recursively executing computer readable code section (a) through computer readable code section (b) until there are no more required dependencies to be added. The computer readable code section (a) includes computer readable code for ascertaining a first plurality of patches, the first plurality of patches representing patches currently in the patch bundle. The computer readable code section (b) includes computer readable code for adding patches that are required dependencies of the first plurality of patches to the first plurality of patches, the adding excluding any of the required dependencies that is already in the first plurality of patches prior to the adding or superseded by any patch in the first plurality of patches prior to the adding.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A and 1B illustrate a prior art portal-based approach to implementing patches

FIG. 3 shows a prior art approach employing cumulative patches.

FIGS. 4A and 4B and 4C illustrate the concept of dependencies.

DETAILED DESCRIPTION OF EMBODIMENTS

Figure 1A:
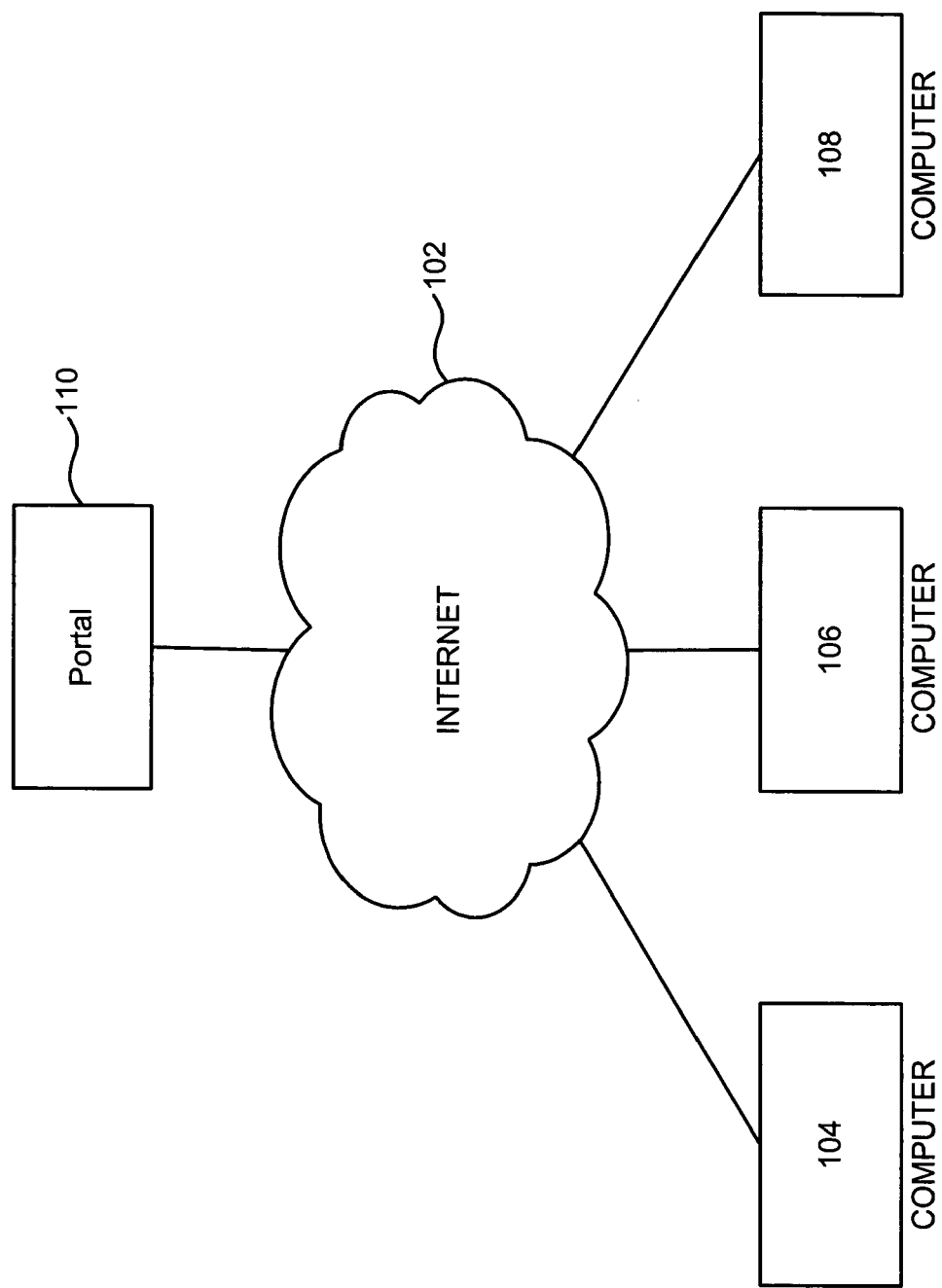
Figure 2:
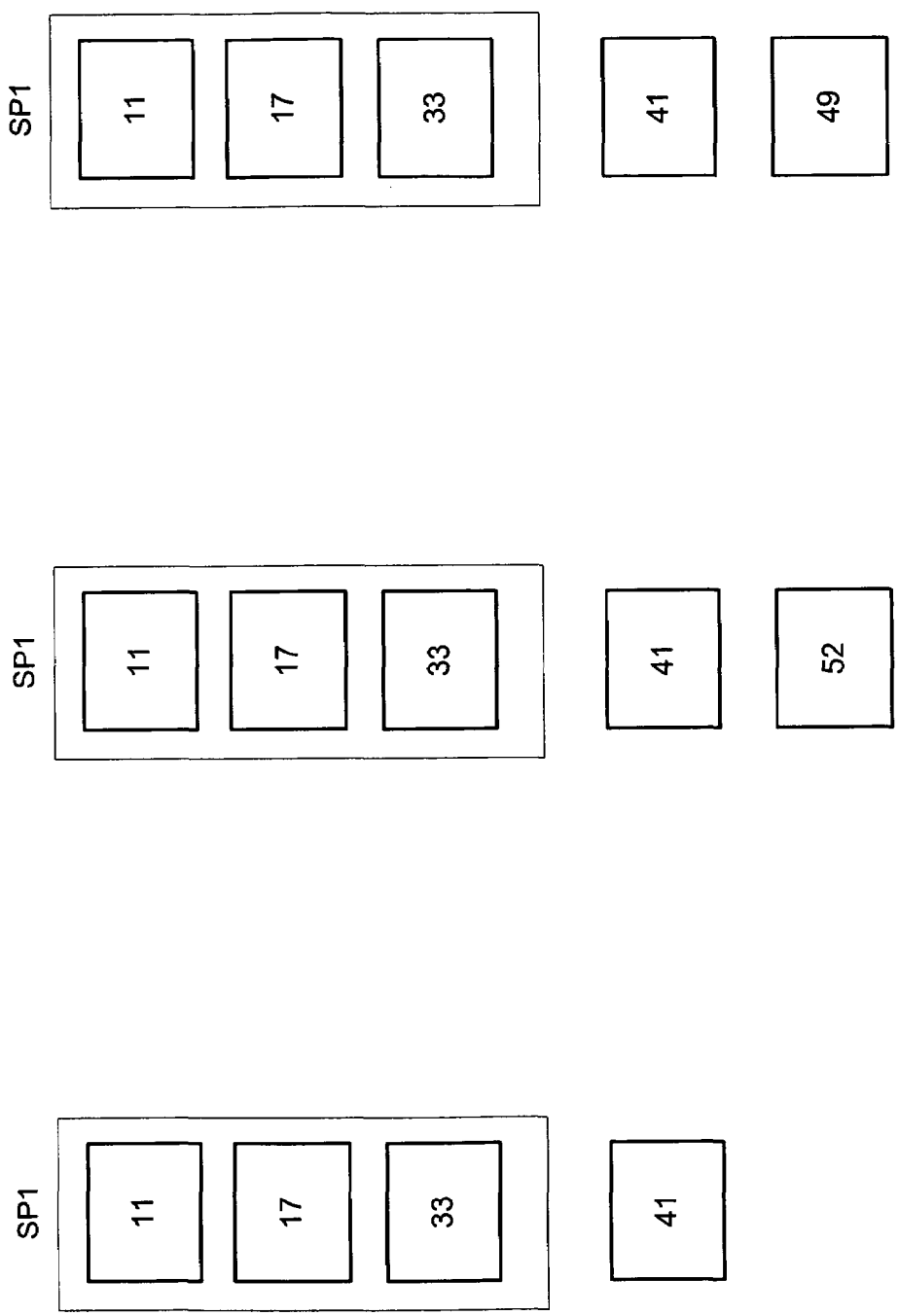
FIG. 2 illustrates a prior art approach involving service packs.
Figure 4B:
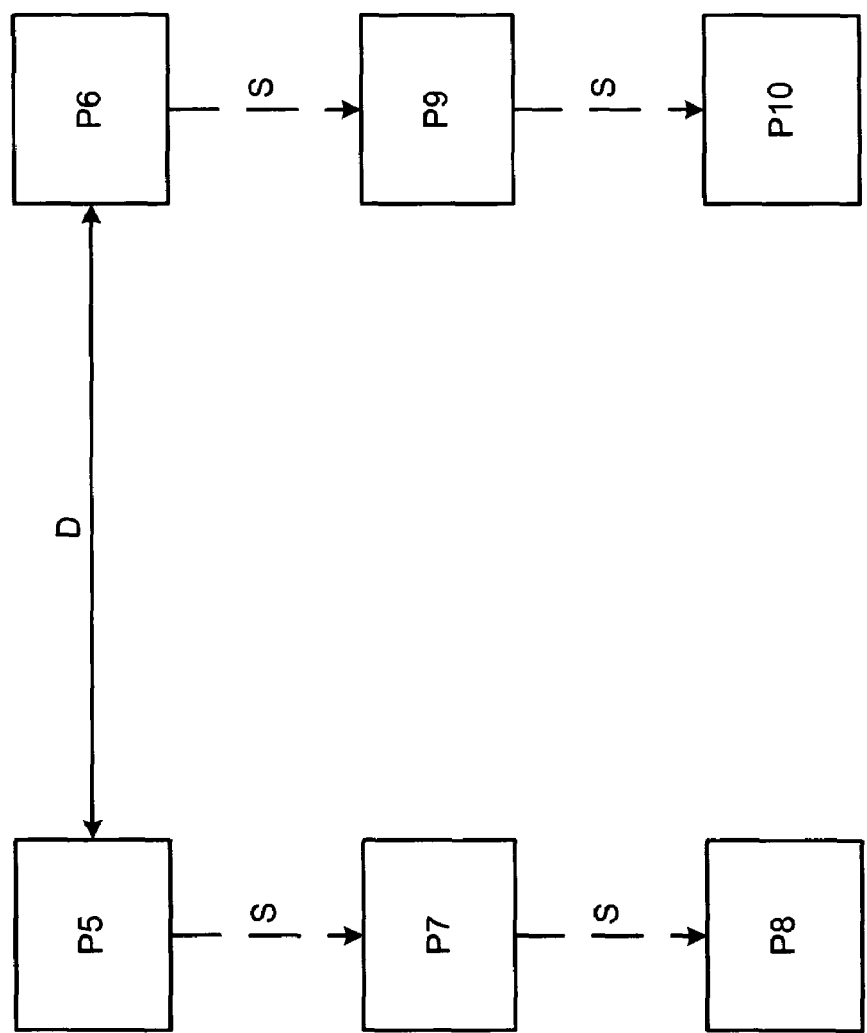
Figure 4C:
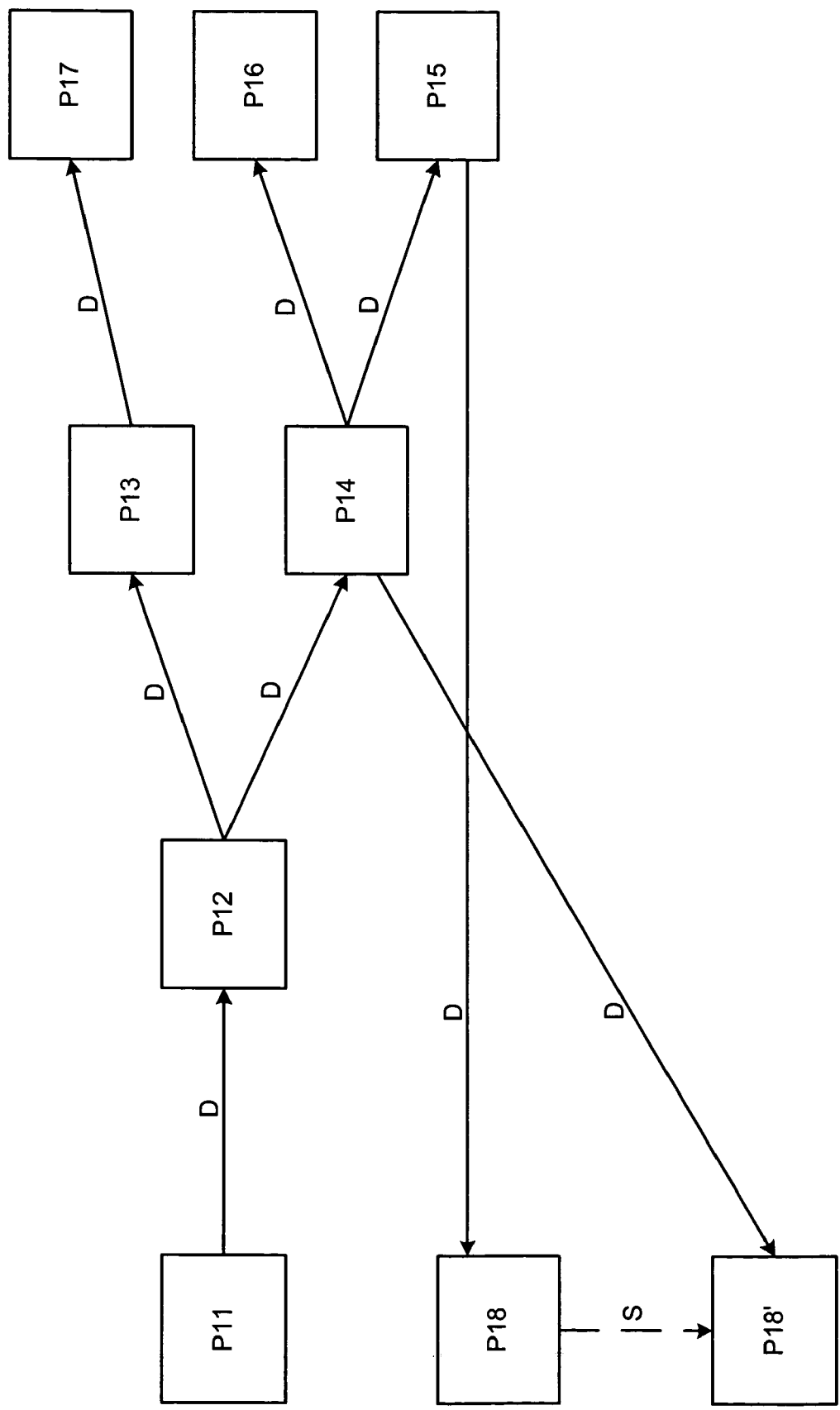

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided arrangements and techniques for automatically creating a customizable all-inclusive patch (CAIP) to implement a user-specified feature. The inventive process of embodiments of the invention is highly automated and configured to produce customizable CAIP. In an embodiment, the user enters the desired patch level, and the CAIP is automatically created as an output, ready to be applied to any computer. Thus, unless there is any option that the operator wishes to have implemented, a CAIP can be created in an embodiment without any operator input once the patch level is specified.

In another embodiment, the operator may be furnished with operator-selectable options and associated patches. The selection of one or more options would automatically cause those associated patches and any other dependencies that depend on the associated patches to be automatically included in the CAIP produced.

Note that the CAIP formed in accordance with embodiments of the present invention would have no external dependencies, i.e., the CAIP has all dependent patches, rendering it unnecessary to apply any additional patch to achieve the desired user-specified feature. Furthermore, the constituent patches in the CAIP are represented in their most up-to-date version, with superseded patches automatically removed from the CAIP so as to avoid conflicts in the computer in which the CAIP is applied.

Figure 5A:
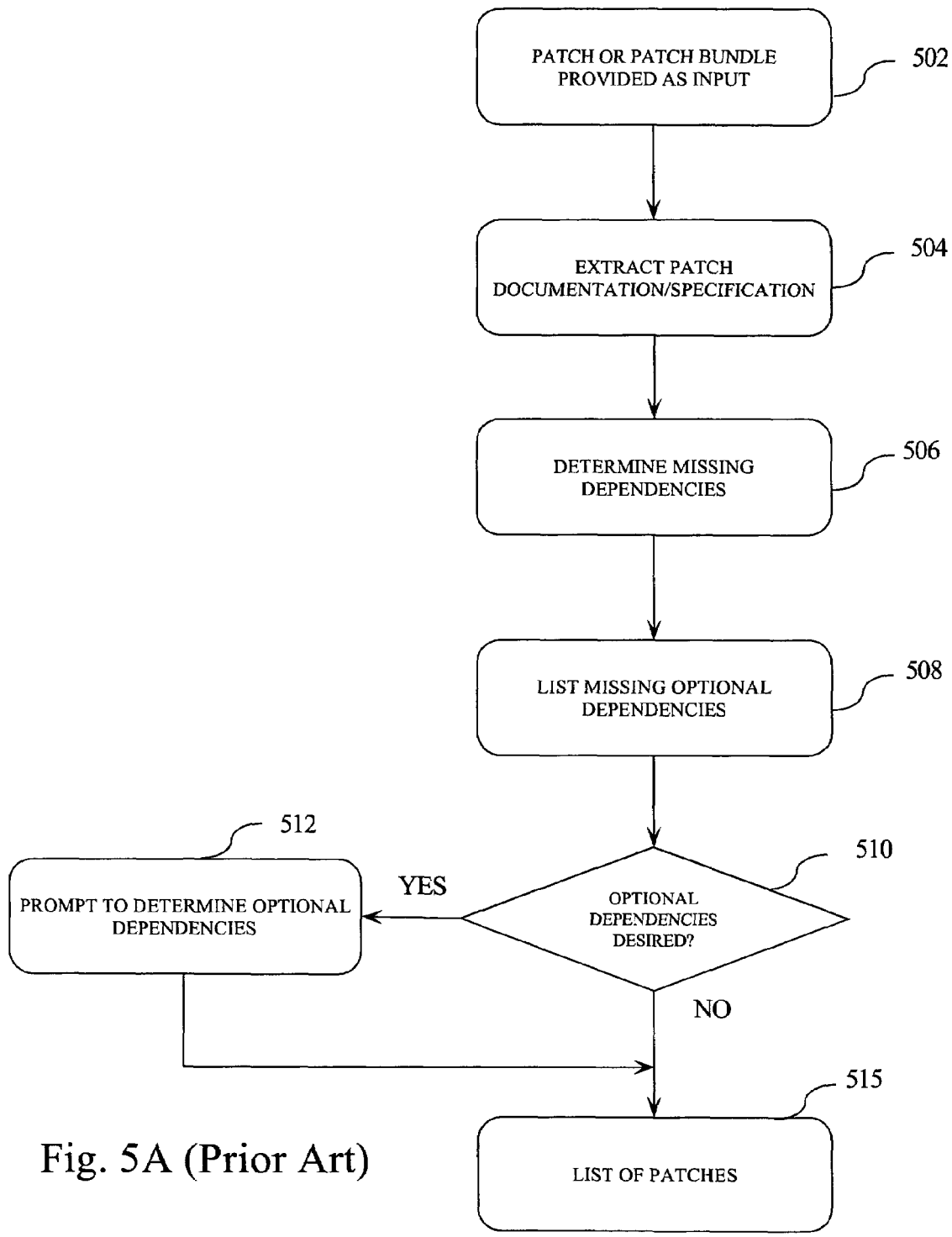
FIGS. 5A and 5B illustrate the prior art approach for resolving patch dependencies.
Figure 5B:
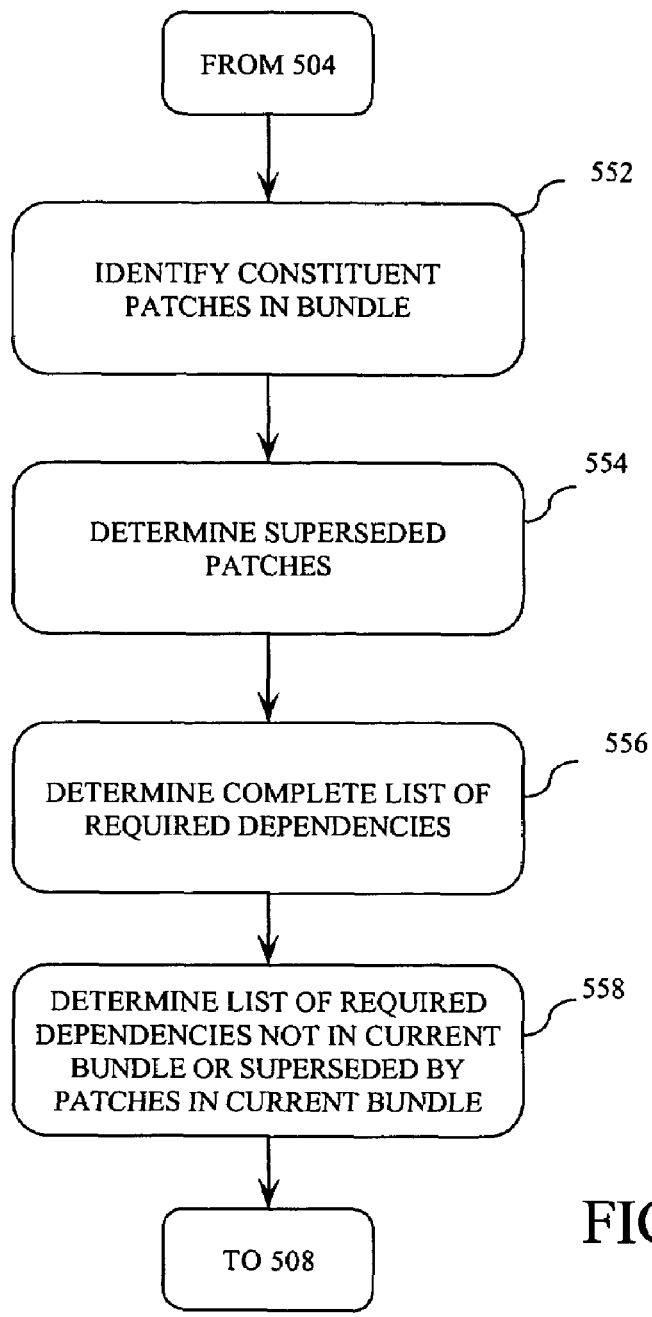

It is realized by the inventors herein although the algorithm of FIGS. 5A and 5B can be applied to a specified patch bundle to obtain a list of dependencies, further improvement is desirable to further automate the patch application process. If the specified patch has dependent patches, these dependent patches also need to be examined, using the algorithms of FIGS. 5A and 5B, to determine whether they themselves have dependencies. If there are multiple levels of dependencies, multiple cycles of manual application of the algorithms of FIGS. 5A and 5B and manual examination of the dependencies found may need to be performed. This is disadvantageous.

Additionally, the end product produced by the algorithm of FIGS. 5A and 5B is a list of dependencies. Further manual work needs to be performed in order to eliminate from the list patches that have been superseded by other patches in the list. The operator must then obtain all the required patches and put them together using a tool such as swpackage, which is available from the Hewlett-Packard Company of Palo Alto, Calif., to create a patch bundle that can be applied to computers in the field.

Figure 6:
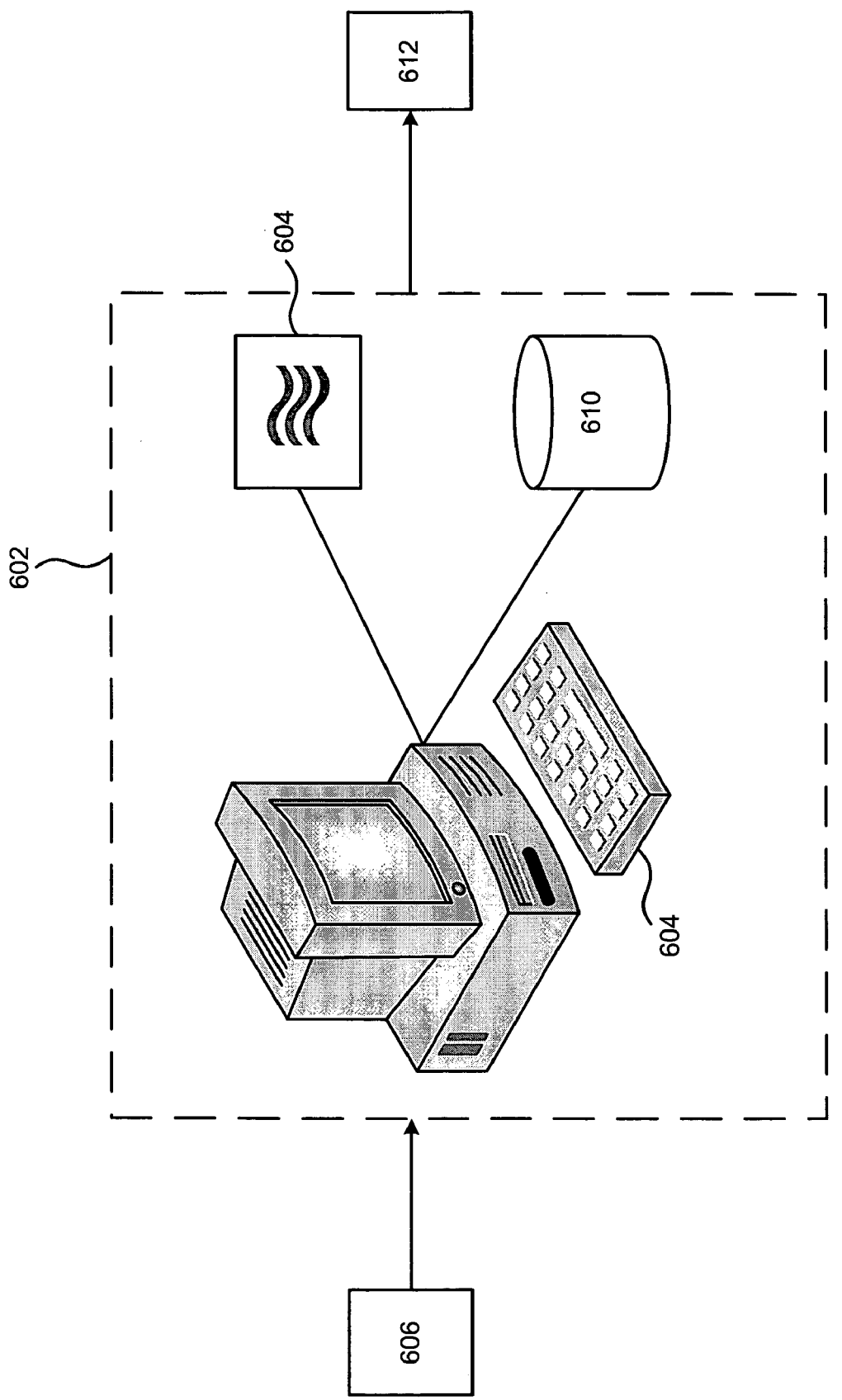
FIG. 6 illustrates a computer system environment for practicing embodiments of the present invention.

Accordingly, the inventors herein have made additional improvements, which will be discussed herein below. FIG. 6 shows, in accordance with an embodiment of the invention, an arrangement for creating the CAIP. Block 602 represents a computer system for executing the CAIP-forming algorithm (shown symbolically by reference number 604). The operator inputs the desired patch level (shown symbolically by reference number 606) using, for example, operator console 608. The algorithm interacts with a patch library 610 to automatically produce a CAIP, which is shown symbolically by reference number 612. Note that unlike the situation in FIGS. 5A and 5B, embodiments of the invention automatically, without requiring user intervention, creates an executable CAIP irrespective whether there are multiple levels of dependencies and whether some of the patches discovered when resolving dependencies are superseded by other patches.

Figure 7:
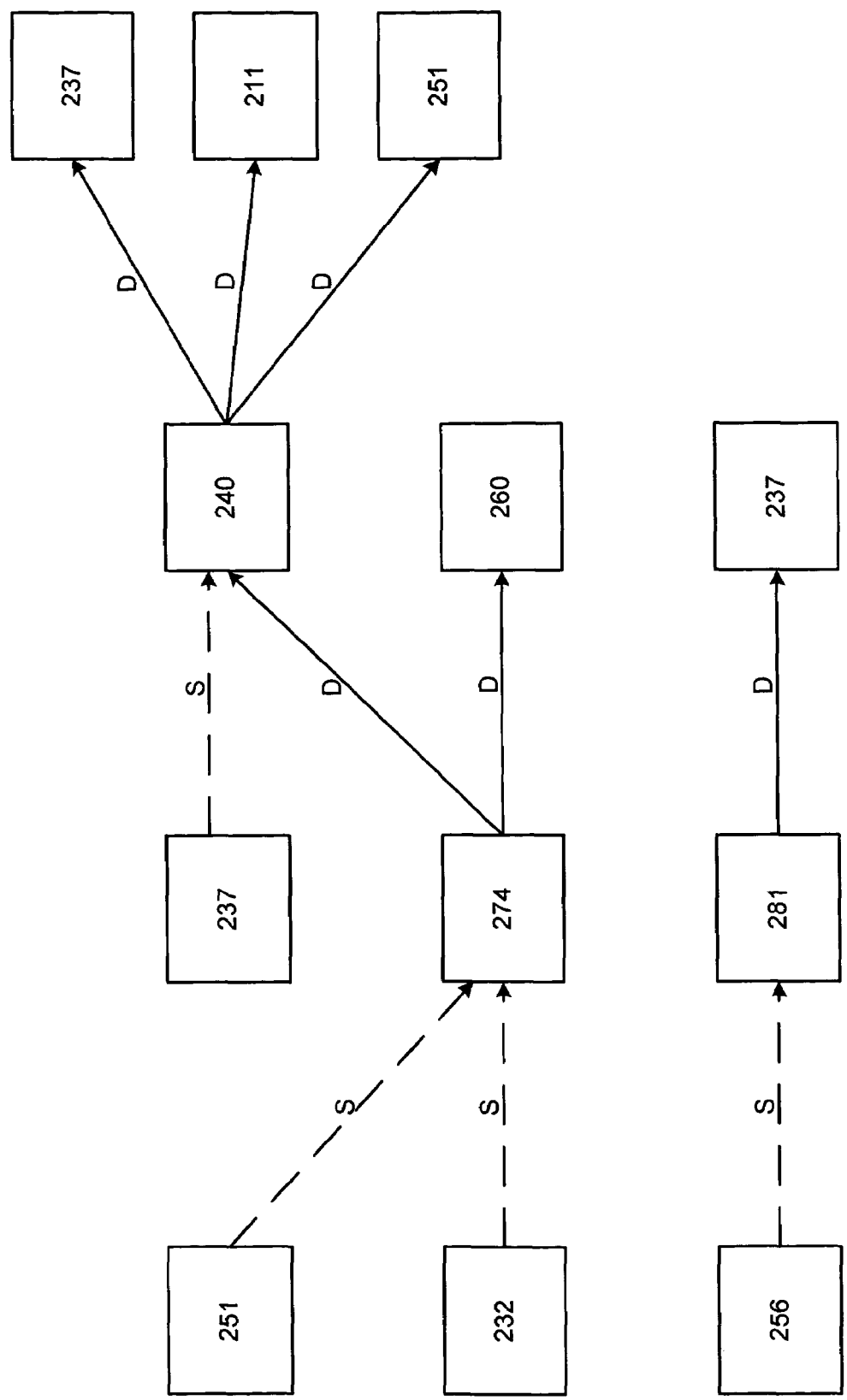
FIG. 7 illustrates an exemplar plurality of patches in which there are superseding and dependent relationships to facilitate discussion of embodiments of the present invention.
Figure 8A:
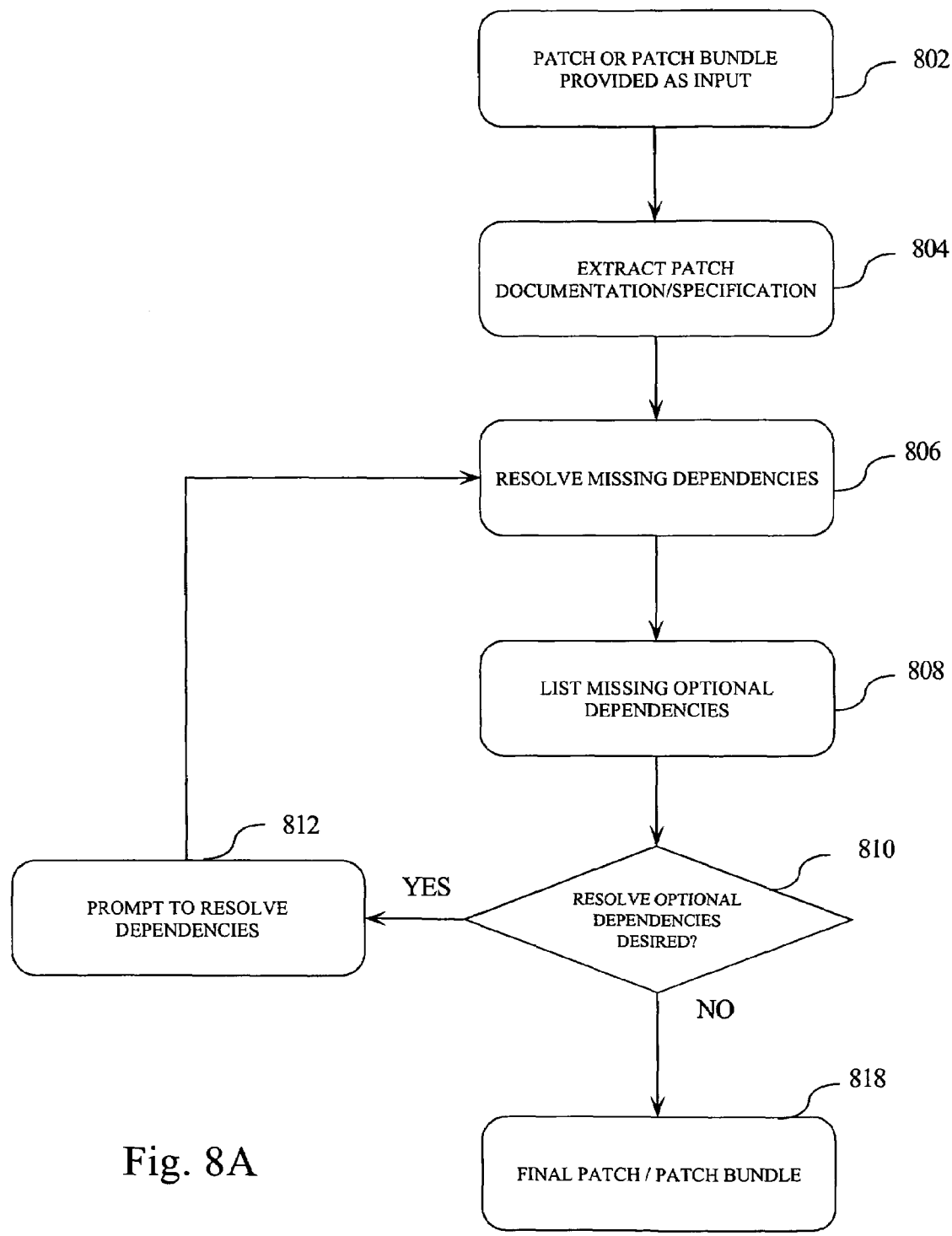
FIGS. 8A and 8B illustrate, in accordance with embodiments of the present invention, an implementation of the recursive customizable all-inclusive patch formation algorithm.
Figure 8B:
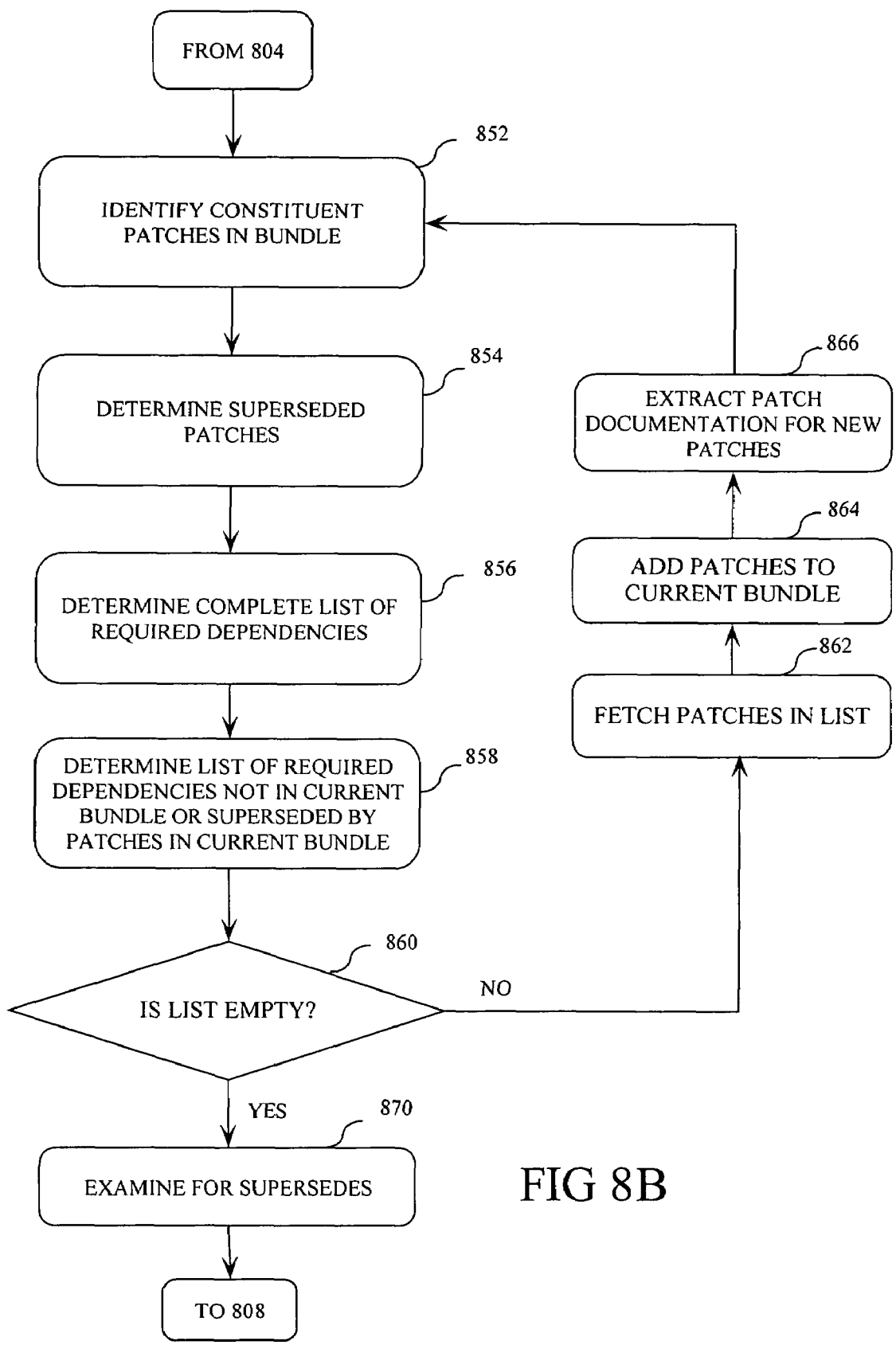

FIGS. 8A and 8B illustrate, in accordance with embodiments of the present invention, implementations of the recursive CAIP formation algorithm. To illustrate the operation of the recursive CAIP formation algorithm, consider the following example, which is illustrated in FIG. 7. Suppose the user wishes to apply patch bundle New_Bundle, which has constituent patches 274 and 281. The documentation of patch 274 indicates that patch 274 supersedes patches 251 and 232. Further, the documentation of patch 274 indicates that patch 274 depends on patches 240 and 260. The documentation of patch 281 indicates that patch 281 supersedes patch 256. Further, the documentation of patch 281 indicates that patch 281 depends on patch 237. Patch 240 is dependent, as indicated in its documentation data, on patches 237, 211, and 251. Further, patch 240 supersedes patch 237.

In step 802, the patch (which may also be a patch bundle) is provided as an input. In the present example, patch bundle New_Bundle is specified in step 802.

In step 804, the patch documentation is extracted. In the case of a patch bundle, such as New_Bundle, the documentation of the constituent patches are read. As mentioned, since each patch is furnished with documentation that describes among other things, the patch name, the patch dependencies, the superseding data, and optional dependency data, an appropriate tool may be employed to parse the patch documentation to provide these pieces of data. To elaborate, the patch name uniquely identifies the patch, such as patch 274. The patch dependencies uniquely identify the patch(es) upon which patch 274 depends. The superseding data identifies the patches that have been superseded by the current patch 274. In the present example, the superseded patches are, for example, 251 and 232. The optional dependency data describes any other dependent patches that must also be applied if certain optional features are selected when installing the current patches.

In one implementation in the HP-UX® environment (HP-UX® represents an operating system available from the Hewlett-Packard company of Palo Alto, Calif.), the tool swlist is employed to read the documentation data from the readme.txt file of a patch. In one implementation, the command swlist-a readme-s<path_to_file> may be employed. Once the documentation data is read, expression matching or another technique may be employed to parse the file read to obtain the aforementioned patch name, patch dependencies, supersedes, and optional dependencies.

In step 806, the required dependencies (i.e., the required dependent patches) are determined. This step is discussed in greater detail in FIG. 8B herein. In step 808, the operator is presented with options and the associated optional dependencies. If the user chooses any option, their dependencies are sent to step 806 to resolve all the dependencies that may be dependent thereon. The end product is patch that contains all required dependencies (and any optional dependencies if one or more options are chosen). The patch creator can then distribute the patch using any modality, including the same modality in which the patch is applied in an embodiment, to allow the patch to be applied to any computer without regard to a specific computer's current patch status (since commercially available software, such as the aforementioned swinstall, within each computer would know which patch(es) that specific computer would need to achieve the patch level implemented by the patch).

FIG. 8B shows in greater detail step 806 (determining the required dependencies). In step 852, the constituent patches in the provided patch bundle are identified. When the provided patch is itself a patch bundle, there are constituent patches, and these constituent patches are identified in step 852. In the present case, patches 274 and 281 are identified in step 852.

In step 854, the patches that have been superseded by the current patch bundle are determined. At this stage, patches 251, 232, and 256 are identified since they are superseded as indicated by the documentation data of patches 274 and 281

In step 856, the complete list of required dependencies for the current patch bundle is determined. At this stage, patches 240, 260, and 237 are identified. In step 858, the list of required dependencies that are not in the current patch bundle or superseded by patches in the current patch bundle is determined. In other words, the list of dependencies identified in step 856 are checked against the current list of patches in the patch bundle (which grows as time progresses if there are unresolved dependencies, as will be seen in step 862) and against the current list of superseded patches (which also grows over time as additional superseded patches are found in step 802 for each iteration as will be seen later).

In this case, patches 240, 260, and 237 are not in the current list of bundle patches (current membership of current list of bundle patches=patches 274 and 281) or the current list superseded patches (membership of current list superseded patches=patches 251, 232, and 256). Thus, the list of required dependencies is unchanged from step 856 to step 858, with its membership still comprising patches 240, 260, and 237 after step 858.

Since the list of required dependencies after step 858 is not empty (as determined by step 860), the patches in the list (i.e., patches 240, 260, and 237) are fetched in the next step 862. In one embodiment, the patches may be fetched from an FTP server although any file transfer technique may be employed to obtain these patches from a patch depository, such as a patch library. Note that this step 862 is performed automatically without operator intervention.

In step 864, the patches in the list of required dependencies (e.g., patches 240, 260, and 237) are added to the current list of bundle patches. Thus, the current list of bundle patches now comprises patches 274, 281, 240, 260, and 237. Next, in step 866, the patch documentation for the new patches in the current list of bundle patches (i.e., documentation for patches 240, 260, and 237) is read and parsed, in the manner discussed earlier in connection with step 804.

The method then returns to step 852 to ascertain the unresolved dependencies for this patch bundle (whose membership was changed via step 864). In step 852, the list of patches in the current bundle is now determined. The determination in this iteration yields patches 274, 281, 240, 260, and 237.

Next, the patches that have been superseded by patches in the current bundle are determined in step 854. The determination in this iteration yields patches 251, 232, 256 and also patch 237 (superseded by patch 240, which is new to the current list of bundle patches).

Next, in step 856, the complete list of required dependencies for the patches in the current bundle is determined. Since the current bundle now contains patches 274, 281, 240, 260, and 237, their dependencies are patches 240 and 260 (for patch 274), 237 (for patch 281), 237, 211, and 251 (for patch 240). Next, in step 858, the list of required dependencies that are not in the current patch bundle or superseded by patches in the current patch bundle is determined. In other words, the list of dependencies identified in step 856 are checked against the current list of patches in the patch bundle and against the current list of superseded patches.

In this case, patches 240, 260, 237 are both in the current list of bundle patches (current membership of current list of bundle patches=patches 274, 281, 240, 260, and 237) and in the list of required dependencies determined in step 856 (current membership of current list of required dependencies=240, 260, 237, 237, 211, and 251). Accordingly, patches 240, 260, and 237 are eliminated and only patches 211 and 251 remain. Additionally, the current list superseded patches contains patch 251 (membership of current list of superseded patches=patches 251, 232, 256, and 237). Accordingly, patch 251 is removed and the list of required dependencies contains only patch 211 after step 858, with patch 251 removed.

Since the list of required dependencies after step 858 is not empty (as determined by step 860), the patches in the list of required dependencies that remain (i.e., patches 256 and 211) are fetched in the next step 862. Again, note that this step 862 is performed automatically without operator intervention.

In step 864, the patches in the list of required dependencies (e.g., patches 256, and 211) are added to the current list of bundle patches. Thus, the current list of bundle patches comprises now patches 274, 281, 240, 260, 237, and 211. Next, in step 866, the patch documentation for the new patches in the current list of bundle patches (i.e., documentation for patch 211) is read and parsed in the manner discussed earlier in step 804.

The method then returns to step 852 to ascertain the unresolved dependencies for this patch bundle (whose membership was changed via step 864 in the last iteration). In step 852, the list of patches in the current bundle is now determined. The determination in this iteration yields patches 274, 281, 240, 260, 237, and 211. Next, the patches that have been superseded by patches in the current bundle are determined in step 854. The determination in this iteration yields patches 251, 232, 256 and 237.

Next, in step 856, the complete list of required dependencies for patches in the current bundle is determined. Since the current bundle now contains patches 274, 281, 240, 260, 237, and 211, their dependencies are patches 240 and 260 (for patch 274), 237 (for patch 281), 237, 211, and 251 (for patch 240).

Next, in step 858, the list of required dependencies that are not in the current patch bundle or superseded by patches in the current patch bundle is determined. Patches 240, 260, 237, and 211 are found in the current patch bundle (current membership of current patch bundle=274, 281, 240, 260, 237, and 211) and are thus eliminated from the list of required dependencies. Patch 251 remains. However, patch 251 is found in the list of superseded patches (membership of current list of superseded patches=patches 251, 232, 256, and 237). Accordingly, patch 251 is removed and the list of required dependencies is empty after this iteration.

Since the list of dependencies is now empty (as determined by step 860), the method proceeds to step 870 wherein final set of patches and patch bundle (s) discovered while iterating through FIG. 8B are examined to determine if any patches in that set supersede other patches in that set. Since having 2 patches from the same supersession stream can cause unnecessary confusion, it is best to keep only the newest patch in the stream and remove all others. In this example, both patches 237 and 240 are in the current patch bundle at step 870. Since patch 237 was identified as a patch that is superseded by patch 240 per FIG. 7, this step would detect this and remove patch 237 from the patch bundle. This supersession check could be performed repeatedly at step 858, but performing the check at 870, it only needs to be performed once.

Note that in the example of FIG. 8B, the list of constituent patches in the bundle (852), the list of superseded patches (854) and the list of required dependencies (856) are determined anew for each recursion. However, it is possible to improve efficiency by determining only the newly added patches and adding those to the list of patches that existed prior to adding (thereby deriving the constituent patches in the current bundle), determining the patches superseded by those newly added patches and adding them to the existing list of supersedes (thereby updating the list of supersedes), and determining the patches that are required dependencies of those newly added patches and adding them to the existing list of required dependencies (thereby updating the list of required dependencies).

Figure 9:
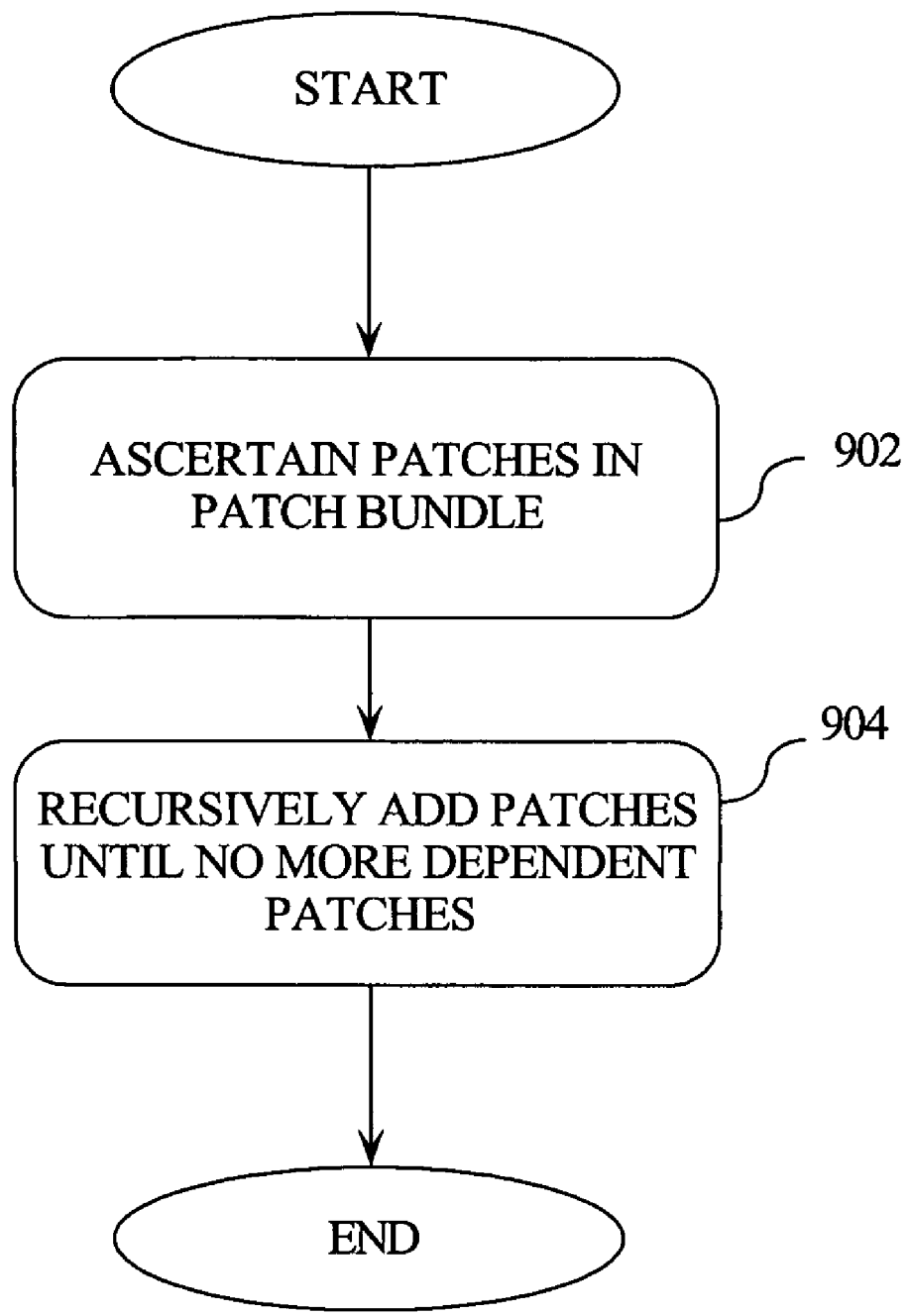
FIG. 9 illustrates, in accordance with another embodiment of the invention, the steps for automatically resolving required dependencies.

FIG. 9 shows, in accordance with another embodiment of the invention, the steps for automatically resolving required dependencies. In step 902, the patches in the patch bundle are ascertained. In step 904, the method recursively drills down to add patches that are required dependencies of patches in the patch bundle to the patch bundle until there are no more dependent patches to be added. At each recursion, dependent patches that are duplicates of or superseded by patches in the current patch bundle are not added to the patch bundle.

As can be appreciated from the foregoing, embodiments of the invention allows the complete patch bundle, including all required dependencies to be obtained automatically without the intervention of the human operator. If optional dependencies are desired, the human operator is given the option to add the optional dependencies, thereby obtaining a patch bundle that is complete with all required and desired dependencies.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for automatically resolving patch dependencies for a patch bundle, comprising:
   recursively performing steps a) through b) until there are no more required dependencies to be added automatically:
   a) ascertaining a first plurality of patches, said first plurality of patches representing patches currently in said patch bundle; and
   b) adding patches that are required dependencies of said first plurality of patches to said first plurality of patches, said adding excluding any of said required dependencies that is already in said first plurality of patches prior to said adding or superseded by any patch in said first plurality of patches prior to said adding,
   wherein the adding comprises:
   removing, from a list of required dependencies of said patches currently in said first plurality of patches, any patch that is one of said patches currently in said first plurality of patches;
   removing from said list of required dependencies any patch that is one of said patches that are superseded by patches currently in said first plurality of patches; and
   adding patches in said list of required dependencies to said first plurality of patches.

2. The method of claim 1 wherein said ascertaining said first plurality of patches includes extracting documentation pertaining to said first plurality of patches.

3. The method of claim 1 wherein said step b) includes for each recursion:
   if said list of required dependencies is not empty adding patches in said list of required dependencies to said first plurality of patches, thereby increasing a membership of said first plurality of patches.

4. The method of claim 3 further comprising extracting patch documentation for said patches in said list of required dependencies if said list of required dependencies is not empty.

5. The method of claim 4 further comprising:
removing, if said list of required dependencies is empty, from said first plurality of patches any patch that is in said list of cumulative supersedes.

6. The method of claim 5 further comprising:
automatically obtaining patches from a data store; said patches representing patches identified in said first plurality of patches;
automatically creating a resultant patch bundle from said patches obtained from said data store.

7. The method of claim 5 further comprising:
presenting a human operator with a list of optional dependencies, said list of optional dependencies representing patches that are optionally dependent on said first plurality of patches;
adding any selected optionally dependent patch of said list of optional dependencies that is desired by said human operator to said first plurality of patches.

8. The method of claim 7 further comprising:
automatically obtaining patches from a data store; said patches representing patches identified in said first plurality of patches;
automatically creating a resultant patch bundle from said patches obtained from said data store.

9. A computer-implemented method for automatically resolving patch dependencies for a patch bundle, comprising:
a) ascertaining a first plurality of patches, said first plurality of patches representing patches in said patch bundle;
b) adding a set of superseded patches to a list of supersedes, said set of superseded patches representing patches that are superseded by said first plurality of patches and not already in said list of supersedes;
c) ascertaining a second plurality of patches, said second plurality of patches represent required dependencies of said first plurality of patches that are neither in said first plurality of patches nor in said list of supersedes; and
d) if said second plurality of patches has at least one member, automatically adding said second plurality of patches to said first plurality of patches, thereby increasing a number of members in said first plurality of patches and repeating step b), step c) and step d);
e) if said second plurality of patches has no members, removing superseded patches, if any, from said first plurality of patches, said superseded patches representing patches in said first plurality of patches that are also in said list of supersedes.

10. The computer-implemented method of claim 9 further comprising:
automatically obtaining patches from a data store; said patches representing patches identified in said first plurality of patches; and
automatically creating said patch bundle from said patches obtained from said data store.

11. The computer-implemented method of claim 9 wherein said ascertaining said second plurality of patches includes extracting patch documentation from patches added to said first plurality of patches in an immediately preceding step d).

12. The computer-implemented method of claim 9 further comprising:
if said second plurality of patches has no members, presenting a human operator with a list of optional dependencies, said list of optional dependencies representing patches that are optionally dependent on said first plurality of patches; and adding any selected optionally dependent patch of said list of optional dependencies that is desired by said human operator to said first plurality of patches.

13. An article of manufacture comprising a program storage medium having computer readable code embodied therein, said computer readable code being configured to automatically resolve patch dependencies for a patch bundle, comprising:
computer readable code for recursively executing computer readable code section (a) through computer readable code section (b) until there are no more required dependencies to be added automatically,
said computer readable code section (a) includes computer readable code for ascertaining a first plurality of patches, said first plurality of patches representing patches currently in said patch bundle, and said computer readable code section (b) includes computer readable code for adding patches that are required dependencies of said first plurality of patches to said first plurality of patches, said adding excluding any of said required dependencies that is already in said first plurality of patches prior to said adding or superseded by any patch in said first plurality of patches prior to said adding;
wherein said computer readable code for adding comprises:
computer readable code for removing, from a list of required dependencies of said patches currently in said first plurality of patches, any patch that is one of said patches currently in said first plurality of patches;
computer readable code for removing from said list of required dependencies any patch that is one of said patches that are superseded by patches currently in said first plurality of patches; and
computer readable code for adding patches in said list of required dependencies to said first plurality of patches.

14. The article of manufacture of claim 13 wherein said computer readable code section (a) includes computer readable code for extracting documentation pertaining to said first plurality of patches.

15. The article of manufacture of claim 13 wherein said computer readable code section (b) includes
computer readable code for
computer readable code for adding, if said list of required dependencies is not empty, patches in said list of required dependencies to said first plurality of patches, thereby increasing a membership of said first plurality of patches.

16. The article of manufacture of claim 15 further comprising computer readable code for extracting patch documentation for said patches in said list of required dependencies if said list of required dependencies is not empty.

17. The article of manufacture of claim 16 further comprising:
computer readable code for removing, if said list of required dependencies is empty, from said first plurality of patches any patch that is in said list of cumulative supersedes.

18. The article of manufacture of claim 17 further comprising:
computer readable code for automatically obtaining patches from a data store; said patches representing patches identified in said first plurality of patches;
computer readable code for automatically creating a resultant patch bundle from said patches obtained from said data store.

19. The article of manufacture of claim 18 further comprising:
- computer readable code for presenting a human operator with a list of optional dependencies, said list of optional dependencies representing patches that are optionally dependent on said first plurality of patches;
- computer readable code for adding any selected optionally dependent patch of said list of optional dependencies that is desired by said human operator to said first plurality of patches.

20. The article of manufacture of claim 19 further comprising:
- computer readable code for automatically obtaining patches from a data store; said patches representing patches identified in said first plurality of patches;
- computer readable code for automatically create a resultant patch bundle from said patches obtained from said data store.

* * * * *

UNITED STATES PATENT AND TRADEMARK OFFICE
CERTIFICATE OF CORRECTION

PATENT NO. : 7,562,356 B2
APPLICATION NO. : 10/947676
DATED : July 14, 2009
INVENTOR(S) : Daniel DeFolo Page 1 of 1

It is certified that error appears in the above-identified patent and that said Letters Patent is hereby corrected as shown below:

On the title page, item (54), in "Title", in column 1, line 2, delete "PATH" and insert -- PATCH --, therefor.

In column 1, line 2, delete "PATH" and insert -- PATCH --, therefor.

In column 12, line 60, in Claim 3, delete "empty" and insert -- empty, --, therefor.

In column 14, line 43, in Claim 15, delete "computer readable code for".

Signed and Sealed this

Twenty-fourth Day of November, 2009

David J. Kappos
*Director of the United States Patent and Trademark Office*